(12) United States Patent
Dong

(10) Patent No.: US 11,419,391 B2
(45) Date of Patent: Aug. 23, 2022

(54) LENGTH ADJUSTER ON WEARABLE DEVICE

(71) Applicant: HANGZHOU AMPHENOL PHOENIX TELECOM PARTS CO., LTD., Zhejiang (CN)

(72) Inventor: Xiaohui Dong, Zhejiang (CN)

(73) Assignee: HANGZHOU AMPHENOL PHOENIX TELECOM PARTS CO., LTD., Zhejiang (CN)

( * ) Notice: Subject to any disclaimer, the term of this patent is extended or adjusted under 35 U.S.C. 154(b) by 105 days.

(21) Appl. No.: 16/646,781

(22) PCT Filed: Sep. 13, 2018

(86) PCT No.: PCT/CN2018/105592
§ 371 (c)(1),
(2) Date: Mar. 12, 2020

(87) PCT Pub. No.: WO2019/052517
PCT Pub. Date: Mar. 21, 2019

(65) Prior Publication Data
US 2020/0288819 A1    Sep. 17, 2020

(30) Foreign Application Priority Data
Sep. 15, 2017  (CN) .......................... 201721180573.2

(51) Int. Cl.
*A44B 11/00*     (2006.01)
*F16H 19/04*     (2006.01)

(52) U.S. Cl.
CPC ............ *A44B 11/005* (2013.01); *F16H 19/04* (2013.01)

(58) Field of Classification Search
CPC ... A44B 11/005; F16H 19/04; G02B 27/0176; G02B 27/01; G02B 2027/0178; Y10T 24/2187
See application file for complete search history.

(56) References Cited

U.S. PATENT DOCUMENTS 2,926,406 A * 3/1960 Zahnor .................. A42B 3/145
                                          24/68 B
3,214,809 A * 11/1965 Zahnor .................... A61F 9/06
                                          24/68 B (Continued)

FOREIGN PATENT DOCUMENTS

CN        205547668 U      9/2016
CN        106490775 A      3/2017

(Continued)

*Primary Examiner* — Robert Sandy
*Assistant Examiner* — Louis A Mercado
(74) *Attorney, Agent, or Firm* — Muncy, Geissler, Olds & Lowe, P.C.

(57) ABSTRACT

A length adjuster on a wearable device includes an arc-shaped shell and a length fine-adjustment mechanism. A first connection rack, a second connection rack, a gear, a button and a return spring of a gear shaft are provided in the arc-shaped shell. The first connection rack, the second connection rack and the gear are meshed with one another. The gear shaft is connected to a clockwork spring mechanism. The gear shaft and the length fine-adjustment mechanism are in a clutch connection. A unidirectional rotation-prevention structure is provided in the length fine-adjustment mechanism, and the unidirectional rotation-prevention structure allows the length fine-adjustment mechanism to drive the gear shaft to rotate in a rotation direction for enabling a clockwork spring to be stretched, and prevents the gear shaft from rotating in the direction opposite to the rotation direction. The length adjuster is provided with a release mechanism.

9 Claims, 3 Drawing Sheets

(56) References Cited

U.S. PATENT DOCUMENTS

| | | | | |
|---|---|---|---|---|
| 3,444,560 A * | 5/1969 | Northup, Jr. | ............ | A42B 3/145 |
| | | | | 2/8.1 |
| 8,056,150 B2 * | 11/2011 | Stokes | .................... | A42B 3/324 |
| | | | | 2/417 |
| 8,161,576 B2 * | 4/2012 | Lemke | .................... | A42B 3/145 |
| | | | | 2/418 |
| 10,031,340 B2 * | 7/2018 | Lai | ............................ | A42B 7/00 |
| 10,095,038 B1 * | 10/2018 | Hsu | ........................ | G02B 7/002 |
| 10,251,289 B2 * | 4/2019 | Chen | .................. | G02B 27/0176 |
| 10,365,494 B2 * | 7/2019 | Lin | .......................... | G06F 1/163 |
| 10,502,363 B2 * | 12/2019 | Edwards | ................ | F16M 13/04 |
| 10,558,052 B2 * | 2/2020 | Chang | ................ | G02B 27/0176 |
| 10,630,332 B2 * | 4/2020 | Lee | ...................... | H04R 1/1091 |
| 10,684,646 B2 * | 6/2020 | Wang | ........................ | G06F 1/163 |
| 10,873,799 B2 * | 12/2020 | Wang | ...................... | H04R 1/028 |
| 11,119,329 B2 * | 9/2021 | Lin | .................... | G02B 27/0176 |
| 2009/0320187 A1 * | 12/2009 | Petzl | ........................ | A42B 3/14 |
| | | | | 2/417 |
| 2010/0050325 A1 * | 3/2010 | Wang-Lee | ............. | A42B 3/145 |
| | | | | 2/418 |
| 2012/0324773 A1 | 12/2012 | Padgett et al. | | |
| 2015/0107006 A1 * | 4/2015 | Chen | ...................... | A42B 3/145 |
| | | | | 2/418 |
| 2015/0316773 A1 * | 11/2015 | Tazbaz | ............... | G02B 27/0179 |
| | | | | 359/630 |
| 2020/0310488 A1 * | 10/2020 | Lin | ...................... | H05K 5/0221 |
| 2021/0149205 A1 * | 5/2021 | Jen | ......................... | G02B 7/002 |

FOREIGN PATENT DOCUMENTS

| | | |
|---|---|---|
| CN | 107065192 A | 8/2017 |
| CN | 207333605 U | 5/2018 |

\* cited by examiner

LENGTH ADJUSTER ON WEARABLE DEVICE

FIELD OF THE INVENTION

The invention relates to a wearable device that belongs to accessory of digital products, and in particular to a length adjuster on a wearable device.

BACKGROUND

Users have high experience requirements for wearable devices such as VR glasses. Therefore, the length of a wearable device and its adaptability to users are extremely important. At present, it is very difficult to freely adjust the length of a wearable device to a designated length and the wearable device has no length fine-adjustment function.

SUMMARY

An object of the present invention is to provide a length adjuster on a wearable device, such that the length can be arbitrarily adjusted and finely adjusted. To achieve the object, the present invention adopts the following technical solutions:

A length adjuster on a wearable device, comprising an arc-shaped shell, wherein a first connection rack, a second connection rack, a gear are provided in the arc-shaped shell, the first connection rack, the second connection rack and the gear are meshed with one another to move in opposite directions, the gear shaft of the gear is connected to a clockwork spring mechanism; the length adjuster is further provided with a length fine-adjustment mechanism, the gear shaft and the length fine-adjustment mechanism are in a clutch connection, the gear shaft is an axially movable shaft, such that the gear shaft and the length fine-adjustment mechanism may be in a clutch connection, the length adjuster is provided with a button and a return spring of the gear shaft, a unidirectional rotation-prevention structure is provided in the length fine-adjustment mechanism, the unidirectional rotation-prevention structure allows the length fine-adjustment mechanism to drive the gear shaft to rotate in a rotation direction for enabling a clockwork spring to be stretched, and prevents the gear shaft from rotating in the direction opposite to the rotation direction, the length adjuster is provided with a release mechanism, for releasing a rotation-prevention effect of the unidirectional transmission structure in the opposite direction, thereby enabling the length fine-adjustment mechanism to drive the gear to rotate in the opposite direction.

Further, the length fine-adjustment mechanism comprises a fixed toothed ring and a pawl wheel, the pawl wheel is sleeved on the gear shaft and behind the gear, a cantilever pawl is provided on the pawl wheel, and the pawl is provided with ratchet teeth that cooperate with the teeth on the toothed ring, the gear shaft is provided with a second gear, the pawl wheel is provided with a third gear, and the third gear is located at the front of the second gear, the second gear and the third gear are in a clutch connection, when pressing the button, the second gear and the third gear are disengaged, and when the button is released, the second gear and the third gear are meshed by the return spring; the length fine-adjustment mechanism is provided with a knob, the knob is connected to the pawl wheel to drive the pawl wheel to rotate in a rotation direction for enabling the clockwork spring to be stretched, the knob is further provided with the release mechanism for releasing a rotation-prevention effect of the unidirectional transmission structure in the opposite direction, such that the knob can drive the pawl wheel to rotate in the opposite direction.

Further, the arc-shaped shell comprises an outer shell and an inner shell, the toothed ring is provided on the inner shell, the pawl wheel rests on the inner shell, and the knob is located between the inner shell and outer shell and is exposed to the arc-shaped shell.

Further, the pawl wheel is provided with a plurality of cantilever pawls along a circumferential direction, and the third gear is located at an axial rear end of the pawl wheel.

Further, arc-shaped shell is provided with a guide rail for rotating the knob, and the toothed ring is located inside the guide rail.

Further, the knob is a disk-shaped knob, the gear rests on the knob, and the gear and the gear shaft are slidingly connected in the axial direction.

Further, the knob loop is provided on the gear shaft, and a shifting block is provided on the knob, and one side of the shifting block is used as the release mechanism and the connection part with cantilever pawl, such that the knob can drive the pawl wheel to rotate in the opposite direction; the other side of the shifting block is also used as the connection part with the pawl wheel, the pawl wheel is provided with a corresponding gear position to drive the pawl wheel to rotate in a rotation direction for enabling the clockwork spring to be stretched.

Further, the clockwork spring has a rotating shell, the rotating shell is connected to a gear shaft, one end of the clockwork spring is fixed, and the other end is connected to the rotating shell.

Further, the arc-shaped shell comprises an outer shell and an inner shell, the middle of the inner shell is further connected to a bottom cover, a central shaft is provided on the bottom cover, one end of the clockwork spring is connected to the central shaft, and the return spring is supported on the central shaft.

Further, the gear is located at the middle of the arc-shaped shell, and the first connection rack and the second connection rack are disposed facing each other and stacked.

With the foregoing technical solutions, the length adjuster of the present invention is capable of arbitrarily adjusting the length and fine-adjustment length, is simple in structure, is applicable to a wearable device, and facilitates the thin design thereof; in addition, the fine-adjustment operation is convenient, and the handfeel is good.

DETAILED DESCRIPTION

Figure 1:
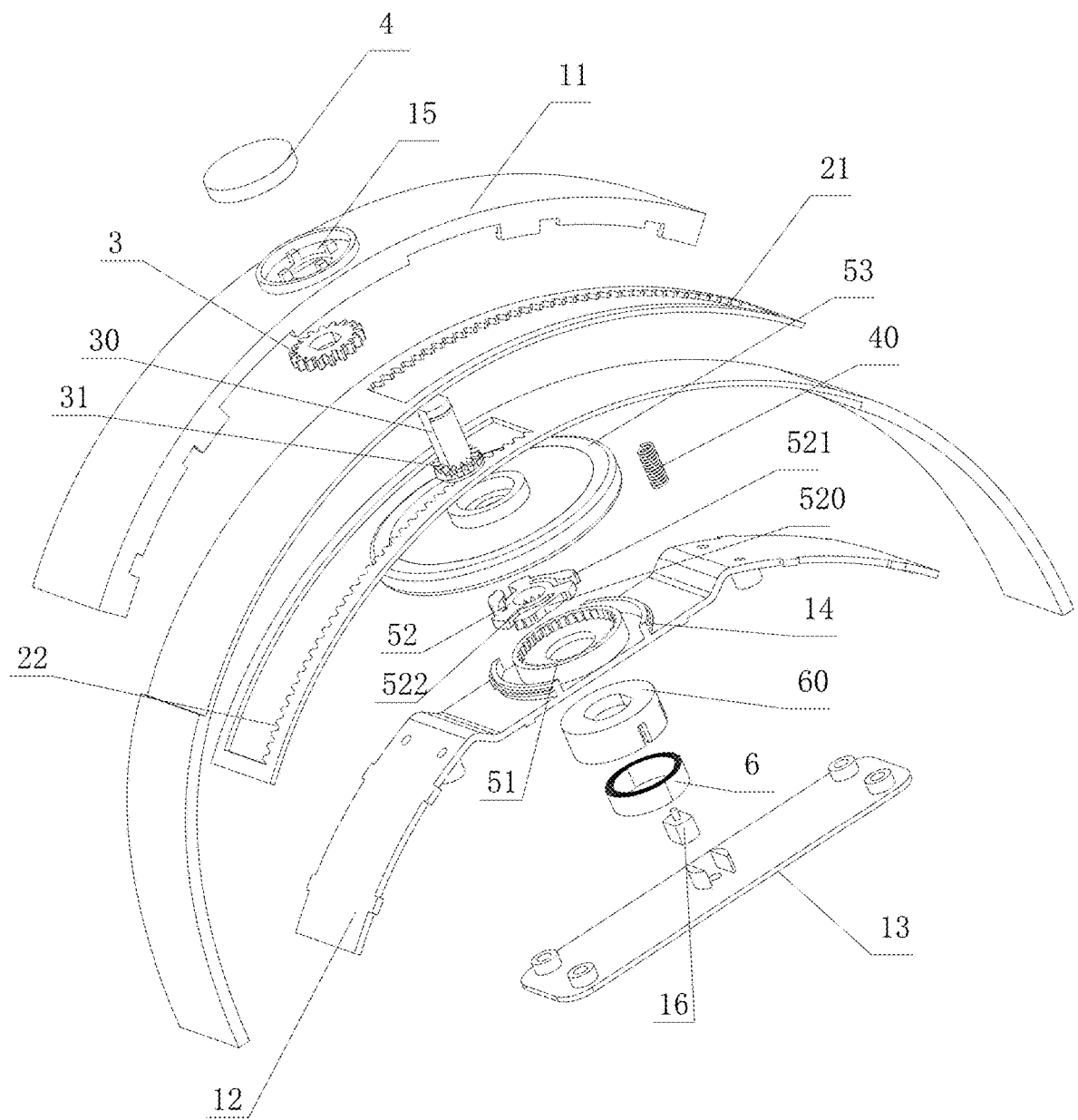
FIG. 1 is an exploded view according to an embodiment of the present invention.
Figure 2:
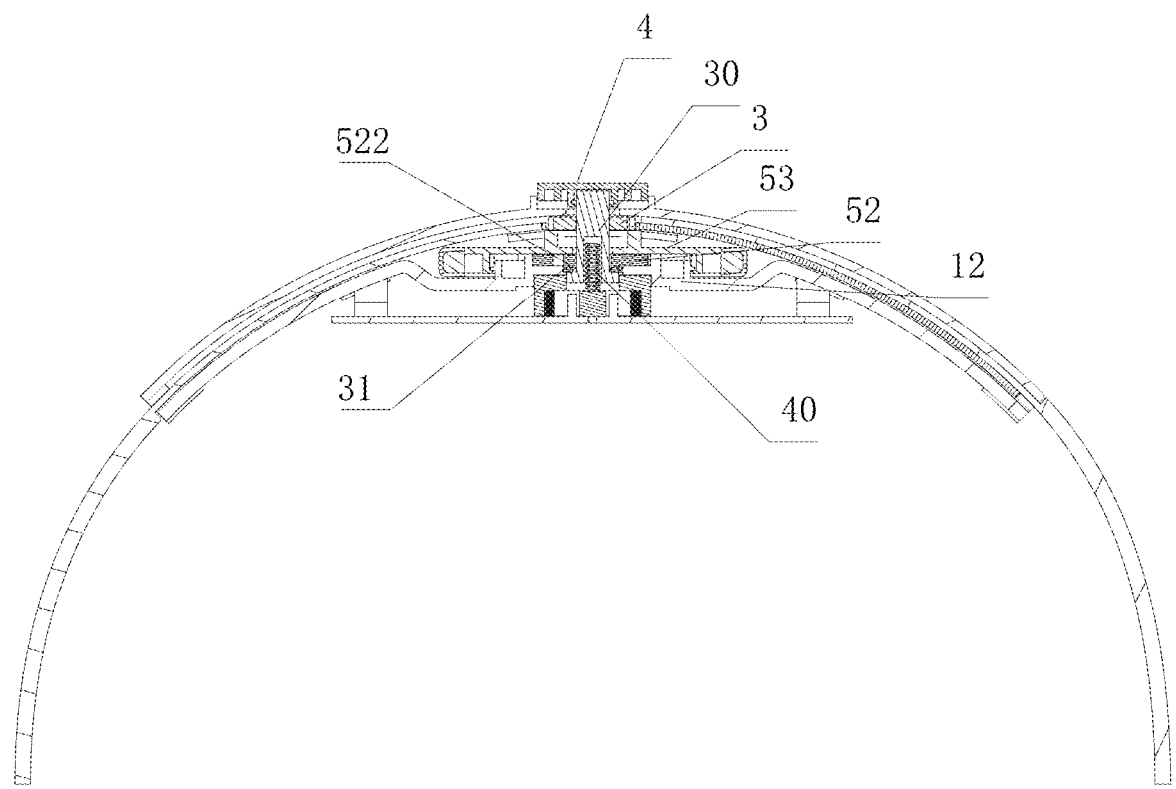
FIG. 2 is a cross-sectional view when the button is not pressed, and the second gear and the third gear are engaged according to an embodiment of the present invention.
Figure 3:
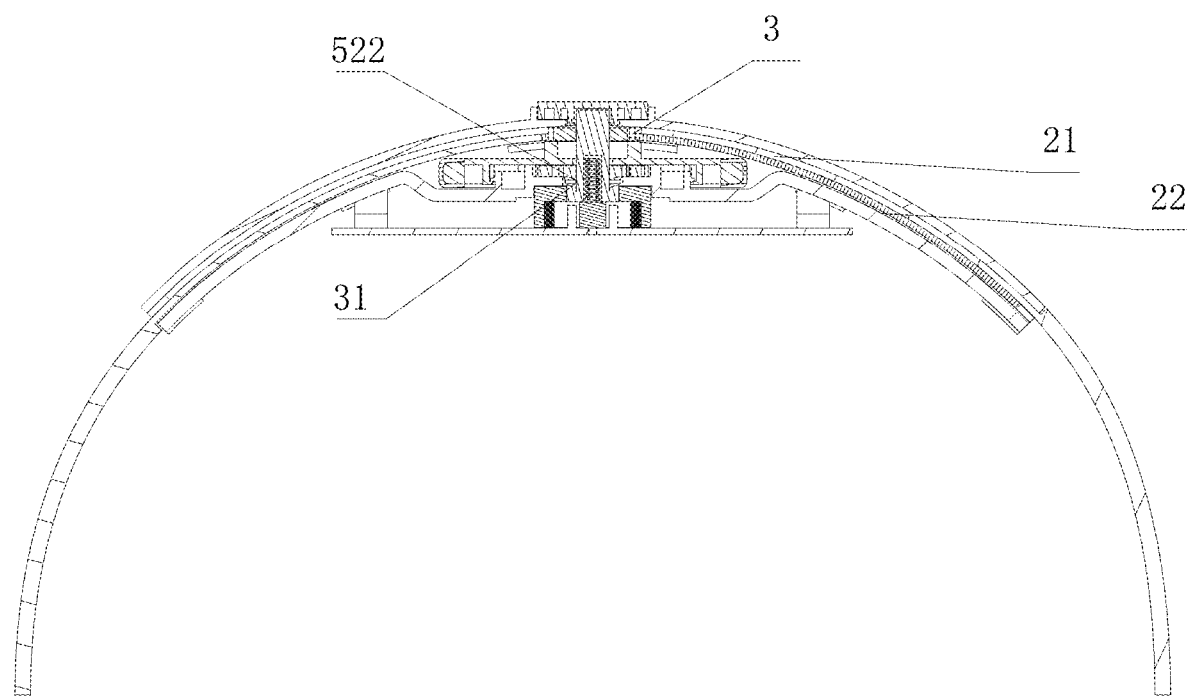
FIG. 3 is a cross-sectional view when the button is pressed and the second gear and the third gear are disengaged according to an embodiment of the present invention.
Figure 4:
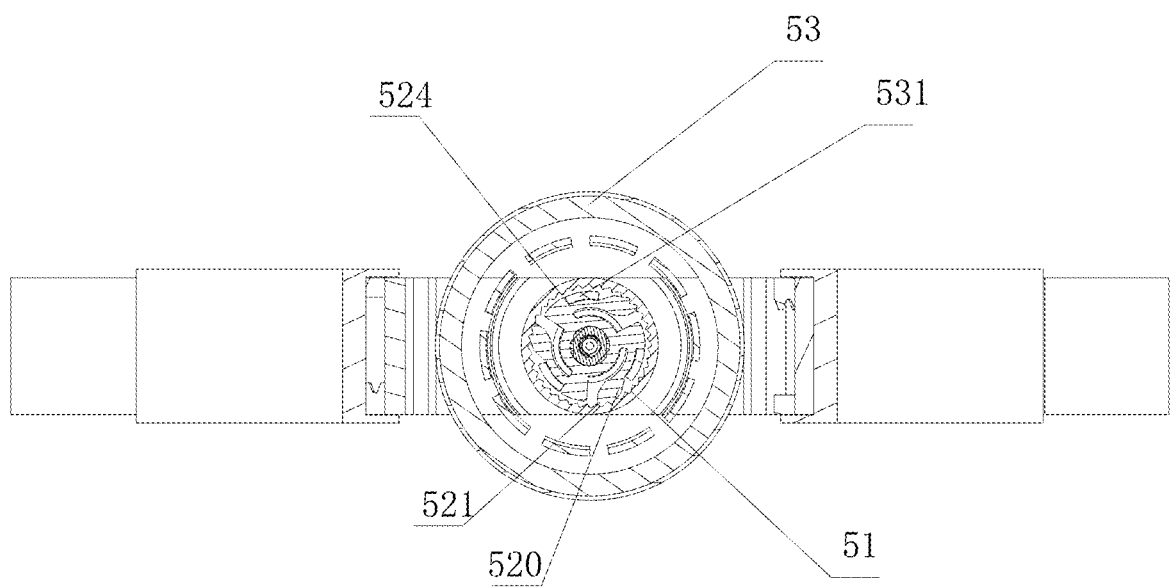
FIG. 4 is a top view after the outer shell is hidden according to an embodiment of the present invention.

Referring to figures, the present invention provides a length adjuster on a wearable device, comprising an arc-shaped shell, the arc-shaped shell comprises an outer shell 11 and an inner shell 12, and further comprises a bottom cover 13, the middle of the inner shell is connected to the bottom cover. A first connection rack 21, a second connection rack 22 and a gear 3 are provided in the arc-shaped shell, the first connection rack 21, the second connection rack 22 and the gear 3 are meshed with one another, and the first connection rack 21 and the second connection rack 22 move in opposite directions from each other. The gear shaft 30 of the gear 3 is connected to the clockwork spring mechanism. The length adjuster is further provided with a length fine-adjustment mechanism, the gear shaft 30 and the length fine-adjustment mechanism are in a clutch connection, the gear shaft 30 is an axially movable shaft, such that the gear shaft 30 and the length fine-adjustment mechanism may be in a clutch connection. The length adjuster is further provided with a button 4 and a return spring 40 of the gear shaft 30, and the outer shell 11 is provided with a button base 15. A unidirectional rotation-prevention structure is provided in the length fine-adjustment mechanism, the unidirectional rotation-prevention structure allows the length fine-adjustment mechanism to drive the gear shaft 30 to rotate in a rotation direction for enabling a clockwork spring to be stretched, and prevents the gear shaft 30 from rotating in the direction opposite to the rotation direction, and this structure also prevents the gear 3 from being rotated by clockwork spring 6 during use, preventing the length from shrinking. The length adjuster is provided with a release mechanism for releasing a rotation-prevention effect of the unidirectional rotation-prevention structure in the opposite direction, thereby enabling the length fine-adjustment mechanism to drive the gear to rotate in the opposite direction, to adjust the length in two directions.

The gear 3 is preferably located in the middle of the arc-shaped shell. The first connection rack 21 and the second connection rack 22 may adopt the same components, and may be stacked face to face or may be arranged symmetrically. Both the first connection rack 21 and the second connection rack 22 have connection positions for connecting belts on the wearable device.

The length fine-adjustment mechanism comprises a fixed toothed ring 51 and a pawl wheel 52, the toothed ring 51 is arranged on the inner shell 12. The pawl wheel 52 is sleeved on the gear shaft 30 and behind the gear 3, the pawl wheel 52 is provided with a plurality of cantilever pawl 520 along a circumferential direction, and ratchet teeth 521 that cooperate with the teeth on the toothed ring 51 are provided on the cantilever pawl 520 to form a unidirectional rotation-prevention structure.

The gear shaft 30 is provided with a second gear 31, the pawl wheel 52 is provided with a third gear 522, the third gear 522 is located at the front of the second gear 31, and the gear shaft 30 and the length fine-adjustment mechanism are in a clutch connection via the second gear 31 and the third gear 522. When pressing the button 4, the second gear 31 and the third gear 522 are disengaged, and when the button 4 is released, they are meshed by the return spring 40. The third gear 522 is located at the axial rear end of the pawl wheel 52.

The length fine-adjustment mechanism is provided with a knob 53, and the knob 53 is connected to a pawl wheel 52, which can drive the pawl wheel 52 to rotate in a rotation direction for enabling the clockwork spring 6 to be stretched. The knob 53 loop is provided on the gear shaft 30, and a shifting block 531 is provided on the knob 53, and one side of the shifting block 531 is used as the release mechanism and the connection part with cantilever pawl 520. When the knob 53 rotates in the opposite direction, the ratchet teeth 521 and the teeth on the toothed ring 51 are disengaged through the cooperation of the shifting block 531 and the cantilever pawl 520, which can release a rotation-prevention effect of the unidirectional transmission structure in the opposite direction and drives the pawl wheel 52 to rotate. The other side of the shifting block 531 is also used as the connection part with the pawl wheel 52, the pawl wheel 52 is provided with a corresponding gear position 524 to drive the pawl wheel 52 to rotate in a rotation direction for enabling the clockwork spring 6 to be stretched. The release mechanism may also be in the form of a switch.

The knob 53 is located between the inner shell 12 and outer shell 11 and is exposed to the arc-shaped shell. The arc-shaped shell is provided with a guide rail for rotating the knob 53, the toothed ring 51 is located inside the guide rail 14, and the pawl wheel 52 rests on the inner shell 12.

The knob 53 is a disk-shaped knob, the gear 3 rests on the knob 53 and is axially positioned, and the gear 3 and the gear shaft 30 are slidingly connected in the axial direction.

The clockwork spring 6 has a rotating shell 60, the rotating shell 60 is connected to a gear shaft 30 to rotate synchronously, one end of the clockwork spring 6 is fixed, and the other end is connected to the rotating shell 60. A central shaft 16 is provided on the bottom cover 13, and one end of the clockwork spring 6 can be connected to the central shaft 16. The return spring 40 is supported on the central shaft 16 that is between the central shaft 16 and the gear shaft 30.

When button 4 is pressed, the third gear 522 and second gear 31 are disengaged, and the gear shaft is not affected by the length fine-adjustment mechanism and its internal unidirectional rotation-prevention structure. When the first connection rack 21 and second connection rack 22 are pulled to increase the length, the gear 3 rotates, and when pulled to an approximately applicable length, the button 4 is released to put the wearable device on the wearing part; if the length is not suitable after wearing, the length fine-adjustment mechanism can be adjusted, such that the gear 3 rotates a small angle and drives the first connection rack 21 and second connection rack 22 to move, to achieve fine-adjustment of length.

When the wearable device is in normal use, because the third gear 522 and second gear 31 are in an engagement state, the unidirectional rotation-prevention structure blocks the spring force of clockwork spring 5 and maintains the existing length. When the wearable device is removed, the button 4 is pressed and the third gear 522 and second gear 31 are disengaged, the gear shaft is not affected by the length fine-adjustment mechanism and its interior unidirectional rotation-prevention structure. The gear 3 is rotated by the clockwork spring, and the first connection rack 21 and the second connection rack 22 are retracted.

The foregoing descriptions are only specific embodiments of the present invention, but the structural features of the present invention are not limited thereto. Any changes or modifications made by those skilled in the art in the field of the present invention shall fall into the scope of protection of the present invention.

The invention claimed is:

1. A length adjuster on a wearable device, comprising an arc-shaped shell, wherein a first connection rack, a second connection rack and a gear are provided in the arc-shaped shell, the first connection rack, the second connection rack and the gear are meshed with one another to move in opposite directions, a gear shaft of the gear is connected to a clockwork spring mechanism; the length adjuster is further provided with a length fine-adjustment mechanism, the gear shaft and the length fine-adjustment mechanism are in a clutch connection, the gear shaft is an axially movable shaft, such that the gear shaft and the length fine-adjustment mechanism may be in the clutch connection, the length adjuster is provided with a button and a return spring of the gear shaft, a unidirectional rotation-prevention structure is provided in the length fine-adjustment mechanism, the unidirectional rotation-prevention structure allows the length fine-adjustment mechanism to drive the gear shaft to rotate in a rotation direction for enabling a clockwork spring to be stretched, and prevents the gear shaft from rotating in an opposite direction to the rotation direction, the length adjuster is provided with a release mechanism for releasing a rotation-prevention effect of a unidirectional transmission structure in the opposite direction, thereby enabling the length fine-adjustment mechanism to drive the gear to rotate in the opposite direction, wherein the clockwork spring has a rotating shell, the rotating shell is connected to the gear shaft, one end of the clockwork spring is fixed, and the other end is connected to the rotating shell.

2. The length adjuster on the wearable device according to claim 1, wherein the length fine-adjustment mechanism comprises a fixed toothed ring and a pawl wheel, the pawl wheel is sleeved on the gear shaft and behind the gear, a cantilever pawl is provided on the pawl wheel, and the cantilever pawl is provided with ratchet teeth that cooperate with teeth on the toothed ring, the gear shaft is provided with a second gear, the pawl wheel is provided with a third gear, and the third gear is located at front of the second gear, the second gear and the third gear are in the clutch connection, when pressing the button, the second gear and the third gear are disengaged, and when the button is released, the second gear and the third gear are meshed by the return spring; the length fine-adjustment mechanism is provided with a knob, the knob is connected to the pawl wheel to drive the pawl wheel to rotate in the rotation direction for enabling the clockwork spring to be stretched, the knob is further provided with the release mechanism for releasing a rotation-prevention effect of the unidirectional transmission structure in the opposite direction, such that the knob can drive the pawl wheel to rotate in the opposite direction.

3. The length adjuster on the wearable device according to claim 2, wherein the arc-shaped shell comprises an outer shell and an inner shell, the toothed ring is provided on the inner shell, the pawl wheel rests on the inner shell, and the knob is located between the inner shell and the outer shell and is exposed to the arc-shaped shell.

4. The length adjuster on the wearable device according to claim 2, wherein the pawl wheel is provided with a plurality of cantilever pawls along a circumferential direction, and the third gear is located at an axial rear end of the pawl wheel.

5. The length adjuster on the wearable device according to claim 2, wherein the arc-shaped shell is provided with a guide rail for rotating the knob, and the toothed ring is located inside the guide rail.

6. The length adjuster on the wearable device according to claim 2, wherein the knob is a disk-shaped knob, the gear rests on the knob, and the gear and the gear shaft are slidingly connected in an axial direction.

7. The length adjuster on the wearable device according to claim 2, wherein a knob loop is provided on the gear shaft, and a shifting block is provided on the knob, and one side of the shifting block is used as the release mechanism and a connection part with the cantilever pawl, such that the knob can drive the pawl wheel to rotate in the opposite direction; the other side of the shifting block is also used as the connection part with the pawl wheel, the pawl wheel is provided with a corresponding gear position to drive the pawl wheel to rotate in the rotation direction for enabling the clockwork spring to be stretched.

8. The length adjuster on the wearable device according to claim 1, wherein the arc-shaped shell comprises an outer shell and an inner shell, a middle of the inner shell is further connected to a bottom cover, a central shaft is provided on the bottom cover, one end of the clockwork spring is connected to the central shaft, and the return spring is supported on the central shaft.

9. The length adjuster on the wearable device according to claim 1, wherein the gear is located at a middle of the arc-shaped shell, and the first connection rack and the second connection rack are disposed facing each other and stacked.

* * * * *